Sept. 8, 1964 R. L. SYLVESTER 3,147,864
GREEN TIRE STORAGE MEANS
Filed Feb. 11, 1963 4 Sheets-Sheet 1
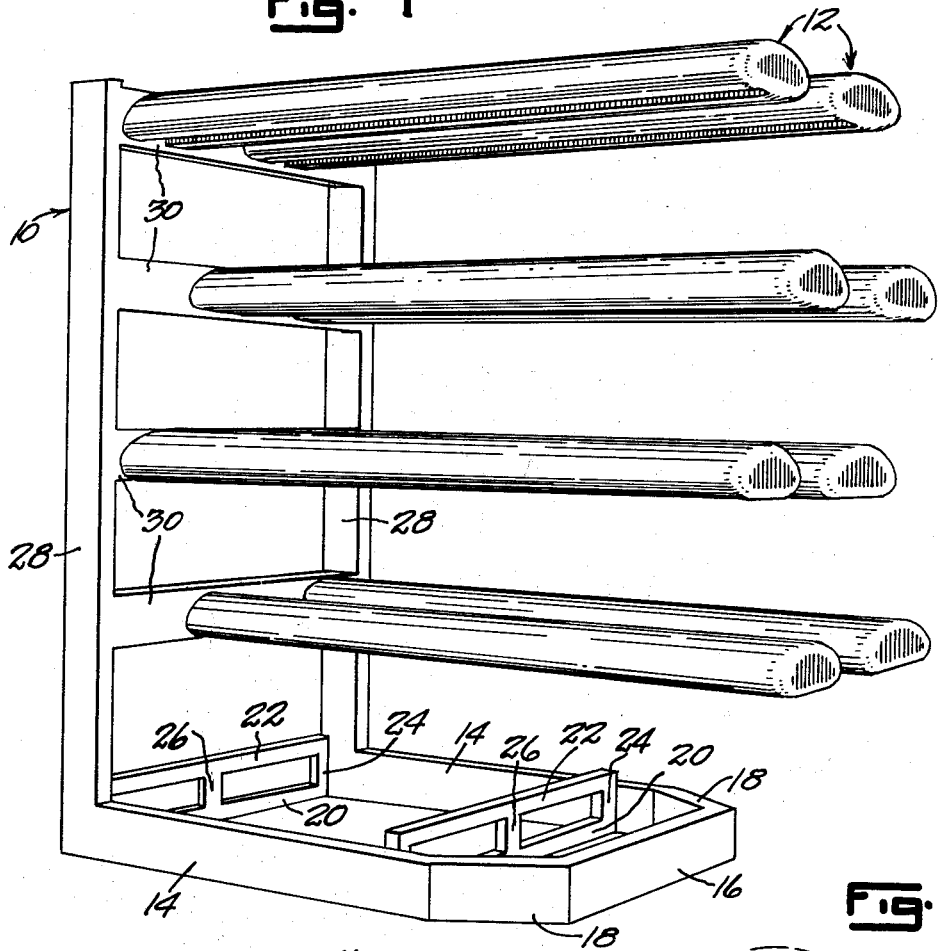
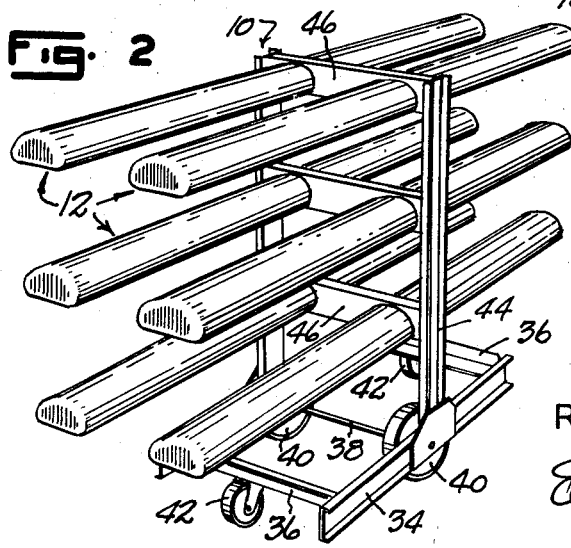
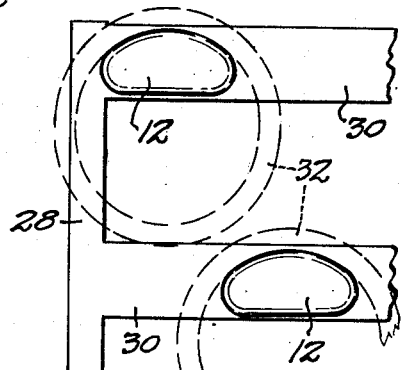
INVENTOR.
ROWLAND L. SYLVESTER
BY
Eugene C. Knoblock
ATTORNEY

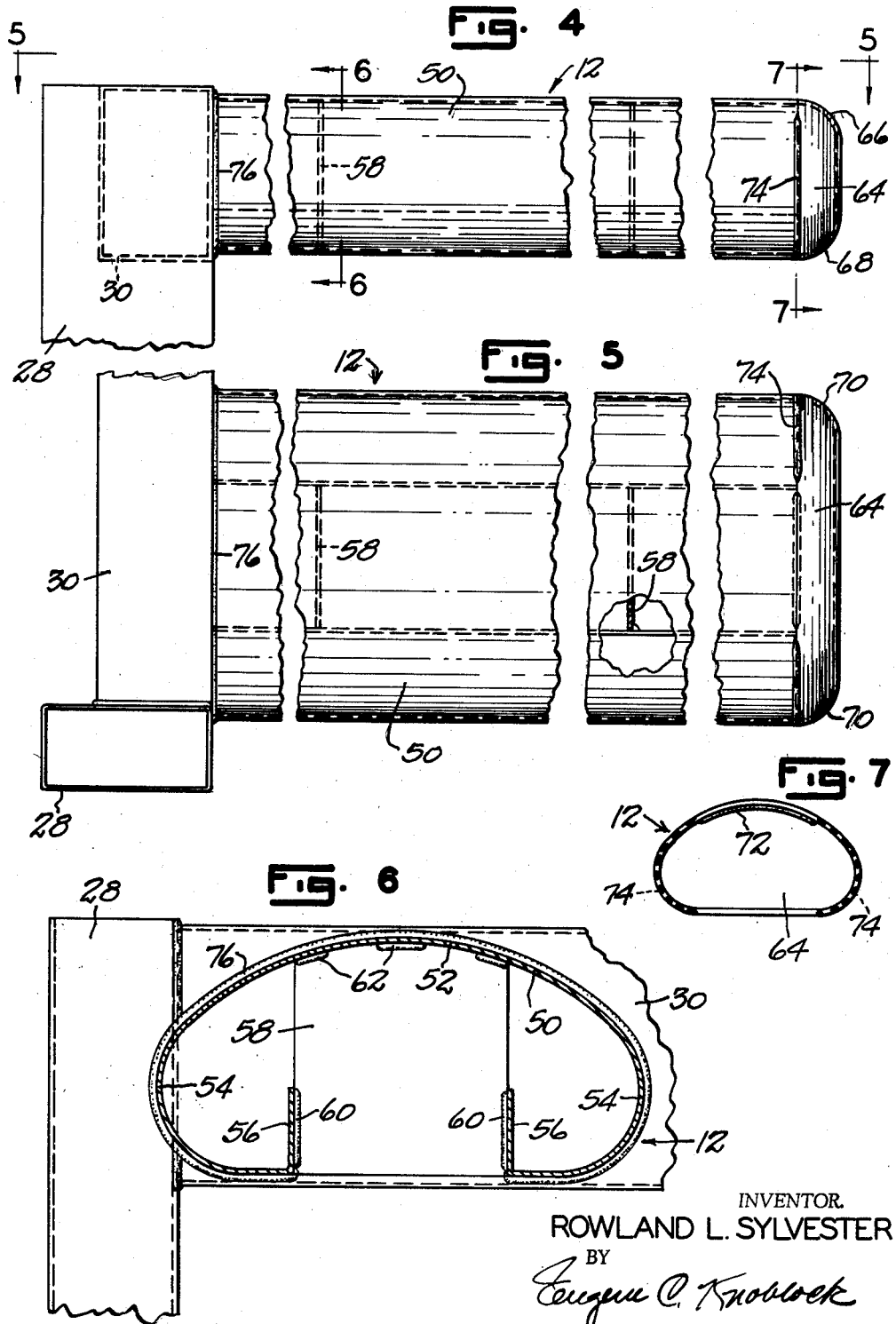

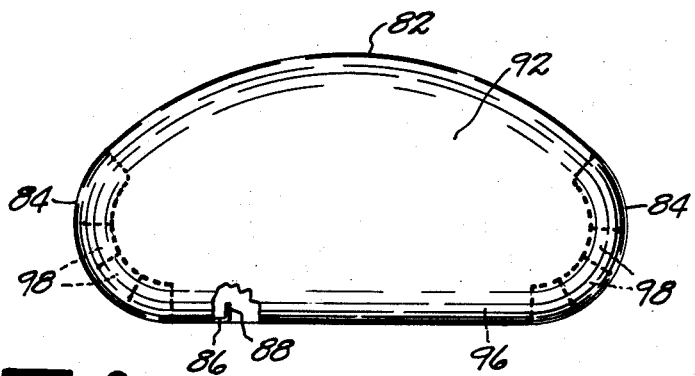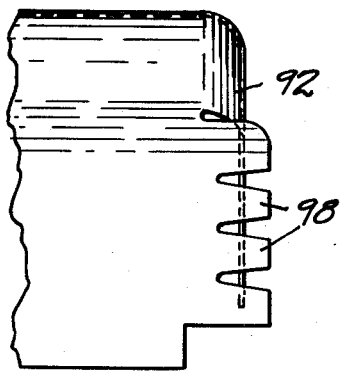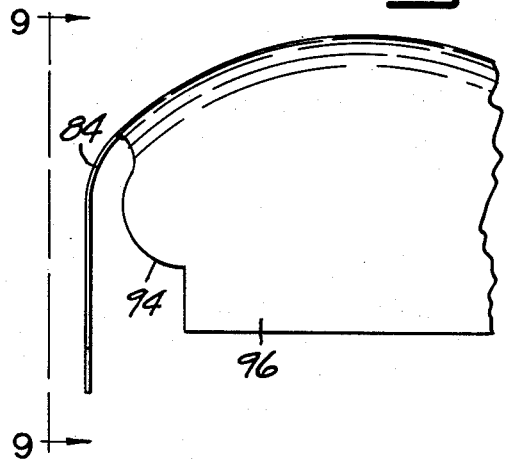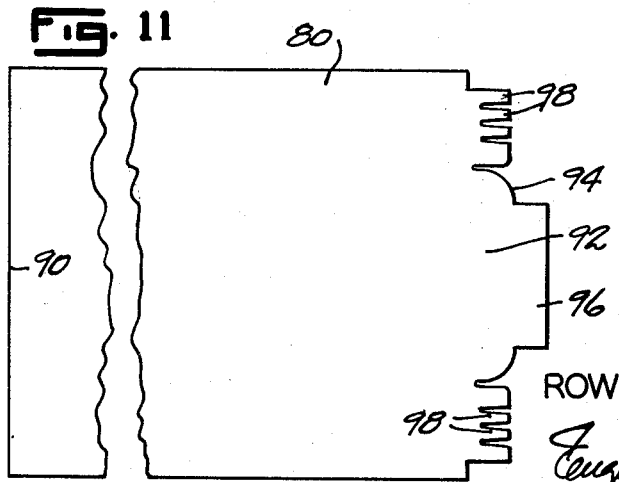

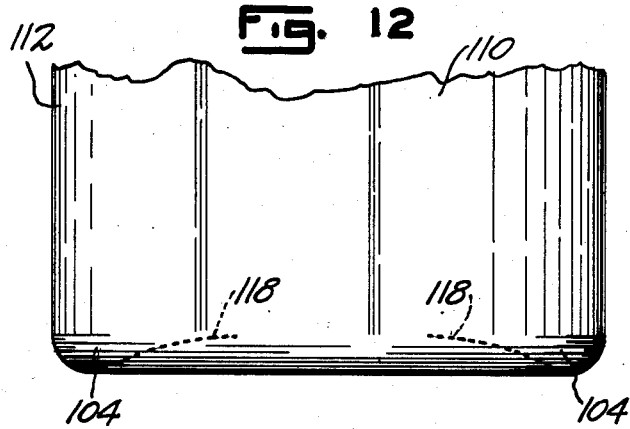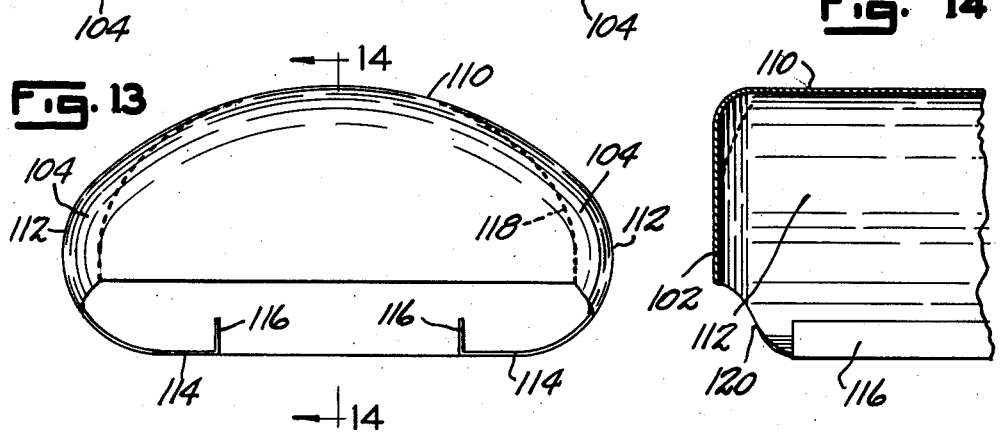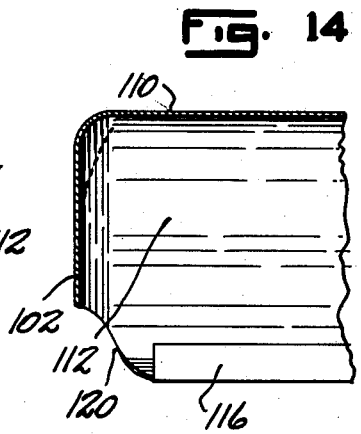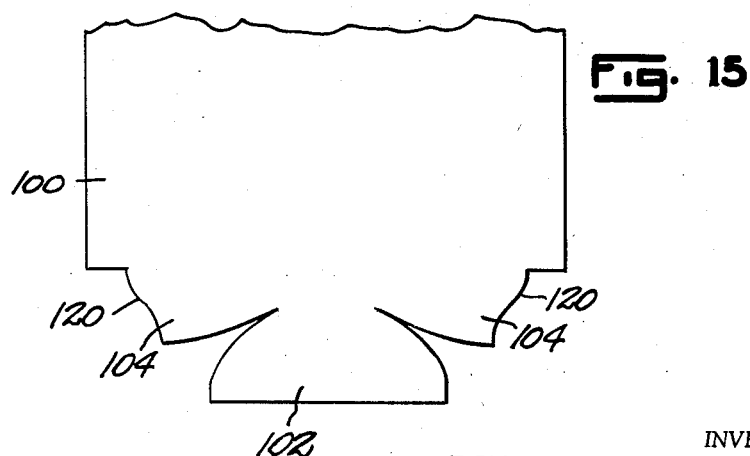

United States Patent Office 3,147,864
Patented Sept. 8, 1964

3,147,864
GREEN TIRE STORAGE MEANS
Rowland L. Sylvester, 962 Riverside Drive,
South Bend 16, Ind.
Filed Feb. 11, 1963, Ser. No. 257,503
8 Claims. (Cl. 211—24)

This invention relates to improvements in green tire storage means.

In the manufacture of automobile and truck tires, it is the usual practice to assemble all parts of the tire into a complete unit which includes the body with suitable cord or fabric reinforcement, the tread and the beads with wire reinforcement. This unit is known in the trade as a green tire. Green tires are usually produced at one location at a plant and are completed by curing or vulcanizing the rubber thereof at another location. Consequently, it is necessary to provide means for storing the green tires after they have been assembled and for transporting them from place to place.

Green tires are very sensitive by virtue of the uncured rubber thereof, and, if they are not properly stored and supported between lay up or assembly thereof and until they are cured, they become defective. At the same time economical manufacture requires the use of equipment which will permit rapid handling of green tires, ready convenient transport thereof, and which will permit support of green tires for substantial periods of time without subjecting the tire to substantial deforming so that it cannot assume desired form and possess the required properties for a first grade tire meeting the specifications set therefor by the manufacturer.

It is the primary object of this invention to provide a device of this character which is light in weight and yet strong so that it can be transported readily from place to place supporting green tires thereon, and which is low in cost so as to be economical for its intended usage.

A further object is to provide a device of this character having substantially horizontal tire-supporting prongs or arms of a cross-sectional configuration permitting support of green tires with minimum likelihood of deformation due to sagging thereof, and which will accommodate tires of a substantial range of diameters.

A further object is to provide a device of this character having a tire-supporting prong or arm of a novel construction provided with reinforcement located interiorly thereof, having exterior surfaces which are smooth and free of burrs or projections which might cut or mar uncured rubber, and in which all exterior surfaces with which the tire may come in contact are rounded so that rapid handling of green tires to mount them upon arms of the support and to remove them from such arms may occur without danger of contact of the tire with corners or edges which might cut, groove or gouge the same.

A further object is to provide an arm or prong for supporting a green tire, which arm is formed of a plurality of sheet metal parts which are welded together in a manner to produce a strong, light weight arm structure, said parts including an elongated body part of curved cross-sectional configuration and a generally cup-shaped end part welded to the body part with a butt weld located at the interior of the central part of the body and at the exterior at inturned marginal portions of the body, and wherein all of said welded joints are ground so as to provide a smooth joint between the body and the end member, so as to avoid occurrence of any surface irregularity which might damage an uncured rubber tire part contacting the same.

Other objects will be apparent from the following specification.

In the drawings;

FIG. 1 is a perspective view illustrating one embodiment of the invention;

FIG. 2 is a perspective view illustrating another embodiment of the invention;

FIG. 3 is a fragmentary end view of the support illustrated in FIG. 1;

FIG. 4 is an enlarged fragmentary side view of an arm employed in the invention and the manner of connection thereof to a frame;

FIG. 5 is a top plan view as seen when viewed in the direction of the arrows 5 in FIG. 4;

FIG. 6 is a transverse sectional view taken on line 6—6 of FIG. 4;

FIG. 7 is a transverse sectional view taken on line 7—7 of FIG. 4.

FIG. 8 is an end view of an arm constituting another embodiment of the invention;

FIG. 9 is a fragmentary side view illustrating a partly formed arm as viewed in the direction of the arrows 9—9 of FIG. 10;

FIG. 10 is a fragmentary end view of a partly formed arm;

FIG. 11 is a partial face view of a blank for an arm constructed as shown in FIGS. 8, 9 and 10;

FIG. 12 is a fragmentary plan view of another construction of arm;

FIG. 13 is an end view of the arm shown in FIG. 12;

FIG. 14 is a fragmentary longitudinal sectional view taken on line 14—14 of FIG. 13;

FIG. 15 is a partial plan view of a blank for an arm constructed as shown in FIGS. 12, 13 and 14.

Referring to the drawings, and particularly to FIGS. 1 to 7, inclusive, the numeral 10 designates a frame or support, and numeral 12 designates tire-supporting arms or prongs. The frame 10 may take different forms and two forms, constituting illustrative embodiments of the invention, are illustrated in FIGS. 1 and 2, respectively.

The frame illustrated in FIG. 1 is intended for support and ready detachable mounting upon the fork lift arms of a fork lift truck. For this purpose the frame is constructed to fit upon such fork lift truck arms. This frame consists of a pair of spaced horizontal elongated substantially parallel base side members 14 which are connected at one end by an end member 16 and which may include converging or angularly extending frame parts 18 between the side members 14 and the end member 16. The frame members 14, 16 and 18 are preferably formed of metal tubing of rectangular cross-section although it will be understood that they may be metal angles, channels or any other suitable structural material. Two or more crossmembers extend between and interconnect the members 14 and preferably are formed of metal tube stock welded together. These cross-members preferably include horizontal lower bars 20 and upper bars 22 spaced a distance to receive fork lift arms with clearance. Horizontal members 20 and 22 are connected by upright end parts 24 and divider part 26. It will be understood that the crossmembers consisting of parts 20, 22, 24 and 26 are strong and rigid, are welded or otherwise fixedly secured to the members 14 of the frame and accommodate stable support of the frame 10 upon the lift arms of a fork lift truck when the latter are passed through the opening formed in the transverse frame parts. The frame 10 of FIG. 1 also includes an upright structure consisting of a pair of rigid upright spaced parallel frame parts 28 preferably extending upwardly from the rear ends of the horizontal frame parts 14. A plurality of spaced horizontal crossmembers 30 are welded or otherwise secured to and extend between the upright frame parts 28. The parts 28 and 30 may constitute metal tubes or other structural members of adequate strength for their intended purpose, namely, to support the arms 12 and green tires 32 suspended from said arms.

The frame 10 illustrated in FIG. 2 is of the wheeled dolly type and consists of a rigid horizontal wheeled frame having longitudinal frame members 34 and transverse frame members 36 connecting the ends of the members 34 and secured thereto by welding or the like. An axle 38 is located at the center of the frame and journals a pair of wheels 40. One or more caster wheels 42 may be mounted at the ends of the frame 34, 36, as at the central parts of the cross-members 36. Frame uprights 44 are secured to the longitudinal frame members 34 substantially centrally thereof and a plurality of vertically spaced cross-members 46 are welded or otherwise secured at various elevations between the upright frame members 44 and serve as means to support the arms or prongs 12 which are here shown as extending in both directions from the members 46.

The tire-carrying arms or prongs 12 are rigid elongated and hollow and are preferably formed of sheet metal. Each of the arms 12 is formed of a plurality of parts suitably welded together in a manner to reinforce and strengthen the arm and provide a strong arm structure. Each arm has a body part 50 which is of a cross-sectional configuration best illustrated in FIG. 6, being characterized by a central part 52 having a uniform transverse curvature, side parts 54 having uniform transverse curvature of a smaller radius than the curvature of central part 52 and having inturned longitudinal flanges 56. The cross-sectional curvature and configuration of each body part is preferably substantially uniform throughout its length and the inturned flange parts 56 extend full length of the body and are spaced apart a substantial distance and preferably are of a width approximately equal to the radius of curvature of the parts 54. The flanges 56 are preferably spaced apart a distance greater than twice the radius of the curved parts 54 but less than the radius of the part 52. The parts 52 and 54 merge at points tangent to each to define a continuous smooth outer convex curvature in the width of each arm.

At a plurality of longitudinally spaced points cross-plates 58 are secured within the body. The cross-plates 58 are of a width equal to the spacing between the flanges 56 and preferably have one edge curved to substantially conform to the curvature of the interior of the arm portion 52. The opposite edge of the plates 58 preferably terminates substantially flush with the bottom outer surfaces of the opposite sides of the arm body. Plate 58 is welded at 60 to the flange 56 and at 62 to the portion 52 of the body. Plates 58 serve to reinforce and strengthen the body to maintain it in its desired shape and to resist twist of the body portion which is of substantial length compared to its cross-sectional dimension as best seen in FIGS. 1 and 2.

Each arm 12 is completed by an end member 64 which is of substantially cup-shape, being characterized by rounded or curved upper marginal part 66, rounded or curved lower marginal portion 68, both as seen in FIG. 4, and by rounded or curved side parts 70, as seen in FIG. 5. The rear edge or open end of the part 64 is flat and is of the same size and cross-sectional configuration as the outer edge of the body 50 of the arm at portions 52 and 54 thereof, as best seen in FIG. 7, so that it may abut the edges of said body and provide a smooth joint therewith when butt welded thereto. The welding is preferably such that a line of welding 62 occurs at the interior of the arm 12 at the part 52, as shown at 72 in FIG. 7, and occurs exteriorly at 74 at the part 54 of the arm, as illustrated by dotted lines in FIG. 7. After the welds 72 and 74 are completed the arm is ground along the joint between the body 50 and the end part 64 to insure a smooth continuous joint surface free of burs and projections.

Each of the arms 12 is secured to a horizontal member of an upright frame part, such as frame part 30 or 46, by welding thereof at 76 substantially continuously around the exterior of the arm at the end opposite the end member 64 and in the manner illustrated in FIG. 6. This provides a strong support of the arm upon the frame assuring maintenance of the desired position of the arm in tire supporting arrangement. The arms 12 are spaced apart upon the frame parts which mount them a sufficient distance to accommodate suspension of green tires 32 therefrom free and clear of tires upon adjacent prongs or arms. If desired, the prongs on adjacent horizontal frame parts 30 may be staggered as illustrated in FIGS. 1 and 3.

This construction of green tire support is characterized by strength and rigidity and assures substantially horizontal positioning of the arms 12 during storage and normal transport of the frame so that green tires suspended thereon, as illustrated in FIG. 3, are retained against sliding therefrom. The green tires can contact only convex surfaces of the arms 12 when supported thereon and when manipulated to apply the same or to remove them. Thus there is no danger of encountering any rough, pointed or sharp corners or edges during either support of the green tires upon the structure or application of the tires to the structure or removal of the tires therefrom. This insures that cuts, bruises, grooves or indentations of the uncured rubber adjacent the beads or other parts of the tire which contact the arms, will be avoided and thus insures that with reasonable care defects in manufacture caused during storage of green tires and transport thereof from place of assembly to the curing room can be avoided.

Another characteristic of the construction is that the part 52 can be of substantial radius or curvature so as to provide suspending support for each green tire at each bead thereof through a substantial portion of its circumference, as illustrated in FIG. 3. This extensive circumferential suspending support eliminates to a minimum sagging deformation of the tires so that the tires may be stored for long periods of time, such as a week or longer, without sagging to such an extent as to be detrimental to accurate shaping thereof when cured in a curing mold. In this connection it will be observed that the wire reinforcing material within the tire beads is a part of the green tires being suspended and provides some rigidity for the tire tending to hold it against sagging but insufficient rigidity to support a green tire in desired form for long periods of time if suspended from a narrow supporting member.

For purposes of illustration and without tending to be limiting, the cross-sectional dimensions of several arms found suitable for use in actual practice are cited. One arm structure found suitable for supporting green tires for use on passenger cars is characterized by an overall width of approximately 11½ inches, curvature of arm part 52 in a radius of approximately 7½ inches, and curvature of arm parts 54 on a radius of approximately two inches. In this construction the flanges 56 are of a width approximately two inches and are spaced apart approximately five inches. A construction found suitable for supporting green tires for use on trucks has arms of a width of approximately 14½ inches, a portion 42 curved on a radius of approximately 8½ inches, portions 54 curved on radii of approximately three inches, a flange width of approximately three inches, and a spacing of flanges 56 in the order of 4½ inches. It is apparent that variations from these specified dimensions may be provided without sacrifice of the desired function and utility of the arms.

A modified construction of the prong or arm used in this device characterized by a one-piece application is illustrated in FIGS. 8 to 11. In this construction a blank 80 of sheet metal is provided of a length slightly greater than the overall length of the desired arm. This blank is of generally rectangular configuration and, at one end thereof, is of a design configuration to be described. The blank 80 is formed into substantially the same configuration as the arm or prong 12 of the previous embodiment and is characterized by a central longitudinal transversely curved part 82 whose curvature is on a large radius, side portions 84 whose curvature is on a comparatively short radius, inturned bottom marginal flanges 86, and an upturned reinforcing flange 88. Flanges 88 are spaced apart at the bottom of the arm at one end of the arm as defined by the edge 90 of the blank as flat or planar and is adapted to be welded to a supporting frame, such as the frame part 30, in the manner previously described.

The end of the blank 80 opposite the end 90 is characterized by a central tongue portion 92 having curved edges 94 and a substantially rectangular reduced width central portion 96. At opposite sides of the tongue 92 are formed a plurality of narrow short tongues 98.

The parts are so proportioned that the tongue 92 may be bent downwardly in an initial forming step, as illustrated in FIGS. 9 and 10, incident to the initial transverse bending of the blank 80. Thereupon, the tongues 98 can be bent inwardly incident to the completion of the formation of the arm, and they can be welded to the tongue 92 and to each other, as shown along the dotted lines in FIG. 8, for the purpose of completing a closure of the end of the arm. In this connection, the portion 96 of the tongue will preferably be bent rearwardly inwardly in the final forming operation. The welding of the tongues serves to strengthen and rigidify them and will preferably be an exterior welding in each instance. Finish buffing along the weld lines will serve to produce a smooth curved surface at the end of the arm which is free of all burrs or projections which might cut or otherwise injure a green tire coming in contact therewith.

Another modified form of the prong or arm is illustrated in FIGS. 12 and 15, and is also a one-piece construction. In this instance the construction is simplified and is characterized by a partially open end. This embodiment utilizes a blank 100 of generally rectangular configuration, provided with a specially configured end characterized by a central reduced width tongue 102 and a pair of similar ear portions 104 at opposite sides of tongue 102.

The blank 100 is bent transversely along its length to uniform configuration having a central top portion 110 bent to a large radius, side portions 112 bent to a comparatively small radius, inturned bottom portions 114, and upturned spaced longitudinal flanges 116. The tongue 102 and the ears 104 are bent downwardly so that the tongue 102 forms an end wall and the ears 104 form curved or rounded portions at each side of the end of the tongue. The tongue 102 is welded at its margin to the ears 104 at 118, and these welds are then buffed to remove burrs and projections.

It will be noted that the arm is open at its lower front portion, as seen in both FIGS. 13 and 14. However, the edges 120 of the ears 104 which define these openings recede inwardly and rearwardly from the bottom edge of the tongue 102 and thus are protected from contact with green tires being mounted upon the arms.

While the preferred embodiments of the invention have been illustrated and described, it will be understood that changes in construction may be made within the scope of the appended claims without departing from the spirit of the invention.

I claim:

1. A device for storing and handling vehicle tire assemblies prior to curing thereof, comprising
   a rigid frame having a substantially upright portion and
   an elongated rigid substantially horizontal arm carried by said upright frame portion,
   said arm having a sheet metal body of substantially uniform cross-sectional shape throughout its length characterized by
   an upper central portion of substantially arcuate shape and of large radius,
   side portions of substantially arcuate shape and of smaller radius and merging with said central portion and
   a longitudinal spaced inturned flange projecting upwardly from the lower inner margin of each side portion,
   said arm terminating in a cup-shaped end part having an edge of the same size and shape as an end edge of said arm body and welded thereto,
   said arm being welded to said upright at the margin of the end opposite said cup-shaped arm part.

2. A device for storing and handling vehicle tire assemblies prior to curing thereof, comprising
   a rigid frame having a substantially upright portion and
   an elongated rigid substantially horizontal arm carried by said upright frame portion,
   said arm having a sheet metal body of substantially uniform cross-sectional shape throughout its length characterized by
   an upper central portion of substantially arcuate shape and of large radius,
   side portions of substantially arcuate shape and of smaller radius and merging with said central portion,
   a longitudinal spaced inturned flange projecting upwardly from the lower inner margin of each side portion,
   said arm terminating in a cup-shaped end part,
   said arm being welded to said upright at the margin of its end opposite said cup-shaped arm part, and
   a transverse reinforcing plate welded in said arm between said inturned flanges.

3. A device for storing and handling vehicle tire assemblies prior to curing thereof, comprising
   a rigid frame having a substantially upright portion and
   an elongated rigid substantially horizontal arm carried by said upright frame portion,
   said arm having a sheet metal body of substantially uniform cross-sectional shape throughout its length characterized by
   an upper central portion of substantially arcuate shape and of large radius,
   side portions of substantially arcuate shape and of smaller radius and merging with said central portion and
   a longitudinal spaced inturned flange projecting upwardly from the lower inner margin of each side portion,
   said arm terminating in a cup-shaped end part having an edge of the same size and shape as an end edge of said arm body and welded thereto,
   said arm being welded to said upright at the margin of the end opposite said cup-shaped arm part,
   the weld between said end part and said body part being external at said arm side portions and internal at said upper central portion,
   said joint between said body and end parts being ground smooth.

4. A rigid arm adapted to be mounted at one end thereof upon an upright support in substantially horizontal position to suspend an uncured vehicle tire assembly, comprising
   an elongated sheet metal body portion of uniform curved cross-section characterized by
   a central upper part of substantially arcuate shape,
   side portions merging with said upper central part and of substantially arcuate shape and of a radius smaller than said central upper part,
   the lower margins of said side portions extending toward each other,
   longitudinal upturned flanges projecting from said lower side portion margins and spaced apart, and
   a sheet metal end member having curved marginal portions terminating in an edge lying in a plane and of a shape and size to register with an end edge of said body portion and welded thereto.

5. A rigid arm adapted to be mounted at one end thereof upon an upright support in substantially horizontal position to suspend an uncured vehicle tire assembly, comprising
- an elongated sheet metal body portion of uniform curved cross-section characterized by
- a central upper part of substantially arcuate shape,
- side portions merging with said upper central part and of substantially arcuate shape and of a radius smaller than said central upper part,
- the lower margins of said side portions extending toward each other,
- longitudinal upturned flanges projecting from said lower side portion margins and spaced apart,
- a sheet metal end member having curved marginal portions terminating in an edge lying in a plane end of a shape and size to register with an end edge of said body portion and welded thereto, and
- a metal cross plate within the outline of said body spaced from said end part and welded to said flanges and said central upper body part.

6. A rigid arm adapted to be mounted at one end thereof upon an upright support in substantially horizontal position to suspend an uncured vehicle tire assembly, comprising
- an elongated sheet metal body portion of uniform curved cross-section characterized by
- a central upper part of substantially arcuate shape,
- side portions merging with said upper central part and of substantially arcuate shape and of a radius smaller than said central upper part,
- said side portions being greater than 90° and slightly less than 180° in extent,
- longitudinal inturned spaced flanges at the lower margins of said side portions, and
- a concavo-convex sheet metal end member having a planar edge of the same size and shape as the end edge of said body and butt welded thereto.

7. A device for storing and handling vehicle tire assemblies prior to curing thereof, comprising
- a rigid frame having a substantially upright portion and
- an elongated rigid substantially horizontal arm carried by said upright frame portion,
- said arm having a sheet metal body of substantially uniform cross-sectional shape throughout its length characterized by
- an upper central portion of substantially arcuate shape and of large radius,
- side portions of substantially arcuate shape and of smaller radius and merging with said central portion and
- a longitudinal spaced inturned flange projecting upwardly from the lower inner margin of each side portion,
- said arm terminating in a rounded end part,
- said arm being welded to said upright at the margin of the end opposite said cup-shaped arm part.

8. A device for storing and handling vehicle tire assemblies prior to curing thereof, comprising
- a rigid frame having a substantially upright portion and
- an elongated rigid substantially horizontal arm carried by said upright frame portion,
- said arm having a sheet metal body of substantially uniform cross-sectional shape throughout its length characterized by
- an upper central portion of substantially arcuate shape and of large radius,
- side portions of substantially arcuate shape and of smaller radius and merging with said central portion and
- a longitudinal spaced inturned flange projecting upwardly from the lower inner margin of each side portion,
- said arm terminating in a rounded end part,
- said arm being welded to said upright at the margin of the end opposite said cup-shaped arm part,
- said end part being formed integrally with said arm body.

References Cited in the file of this patent

UNITED STATES PATENTS

| 1,581,352 | Kuen | Apr. 20, 1926 |
| 2,306,540 | Bales | Dec. 29, 1942 |
| 2,621,815 | Gannon | Dec. 16, 1952 |